INVENTOR.
ROBERT E. KINKEAD
BY
RICHEY, WATTS, EDGERTON & McNENNY
ATTORNEYS

March 25, 1958  R. E. KINKEAD  2,828,406
APPARATUS FOR FUSING SURFACE OF SLAB
Filed March 9, 1953  3 Sheets-Sheet 2

INVENTOR.
ROBERT E. KINKEAD
BY
RICHEY, WATTS, EDGERTON & McNENNY
ATTORNEYS

March 25, 1958  R. E. KINKEAD  2,828,406
APPARATUS FOR FUSING SURFACE OF SLAB
Filed March 9, 1953  3 Sheets-Sheet 3
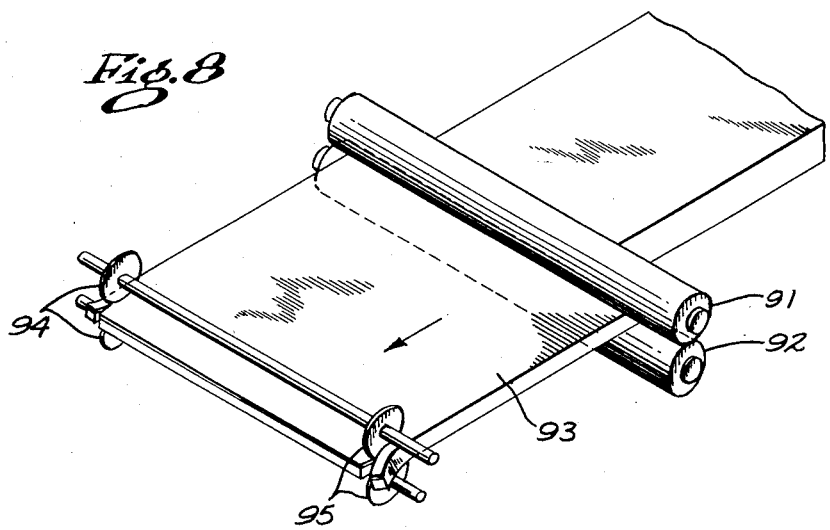
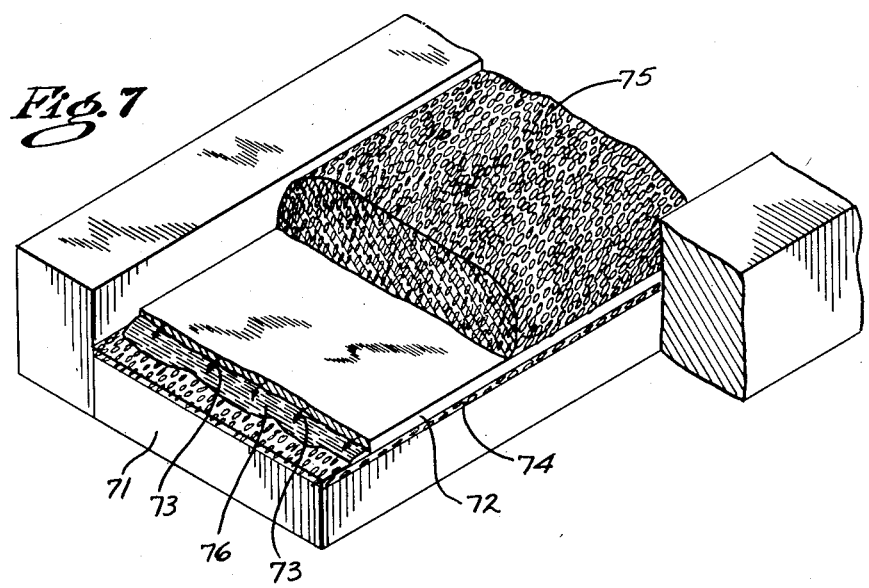
INVENTOR.
ROBERT E. KINKEAD
BY
RICHEY, WATTS, EDGERTON & McNENNY
ATTORNEYS United States Patent Office 2,828,406
Patented Mar. 25, 1958

2,828,406

APPARATUS FOR FUSING SURFACE OF SLAB

Robert E. Kinkead, Youngstown, Ohio, The Cleveland Trust Company, executor of said Robert E. Kinkead, deceased, assignor to The Cleveland Trust Company, Cleveland, Ohio, a corporation of Ohio, as trustee Application March 9, 1953, Serial No. 340,959

9 Claims. (Cl. 219—76)

This invention relates generally to metal joining and more particularly to the forming of composite metal slabs and to the elimination of imperfections in the surface of such slabs.

In some applications such as the manufacture of cooking ware and the like it is highly desirable to produce metal comprising a base sheet of low carbon steel clad with a surface of stainless steel. In my co-pending application Serial No. 240,924, filed August 8, 1951, now Patent No. 2,653,212, a method is disclosed for cladding a slab of carbon steel with a layer of stainless steel which may be rolled to sheets of composite metal of any desired thickness. It has been found, however, that small imperfections sometimes form near the surface of the cladding metal caused by microshrinkage which, although very minute before rolling, tend to be exaggerated by the rolling of the clad sheets.

According to the invention of the said Patent No. 2,653,212, the clad metal is integrally bonded to the surface of the base metal by arc welding with prone electrodes covering the surface producing a permanent bond without excessive dilution of the cladding metal by the base metal so that when stainless steel is clad onto low carbon steel the percentage of the alloying ingredients in the cladding metal is not so greatly reduced as to cause the surface to lose its stainless quality. Prior efforts to eliminate the surface defects resulting from microshrinkage of the clad metal have been unsuccessful either because of prohibitive cost or from dilution of the clad metal.

It is an important object of this invention to economically and rapidly fuse or melt the surface of large slabs of metal without imparting undesirable properties to the metal.

It as another object of this invention to provide a method and apparatus for refusing the surface of metal slabs thereby eliminating surface imperfections.

It is still another object of this invention to provide a method and apparatus for forming clad slabs of metal comprising a base metal and a surface metal and to eliminate any defects in the surface thereby providing a slab which may be satisfactorily rolled.

The foregoing and other objects and advantages will become apparent in view of the following description taken in conjunction with the drawings, wherein:

Fig. 7 is a perspective view showing another form of an arrangement for producing a composite or clad slab utilizing a single flat electrode; and, Fig. 8 is a perspective view showing the rolling and trimming operation carried out to complete the composite or clad metal sheet.

Figure 1:
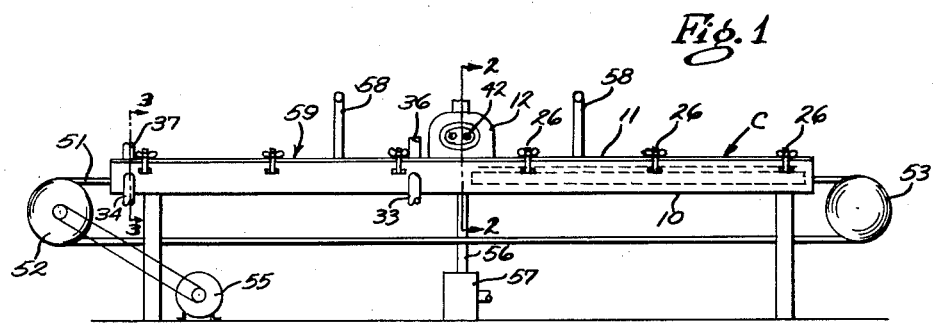
Fig. 1 is a side elevation of a simplified structure for fusing the surface of the clad slab.
Figure 2:
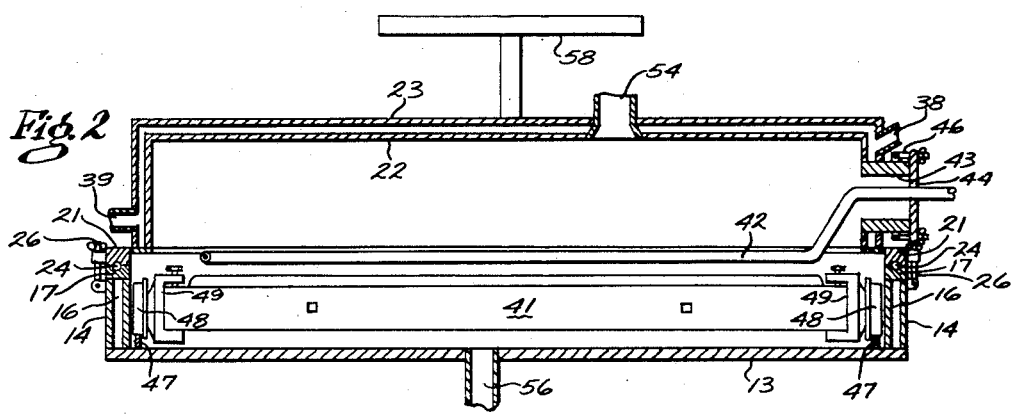
Fig. 2 is a cross section view taken along 2—2 of Fig. 1.
Figure 3:
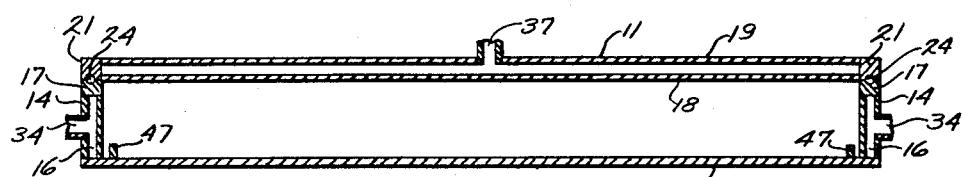
Fig. 3 is a cross section with some parts removed for purposes of simplification taken along 3—3 of Fig. 1.
Figure 4:
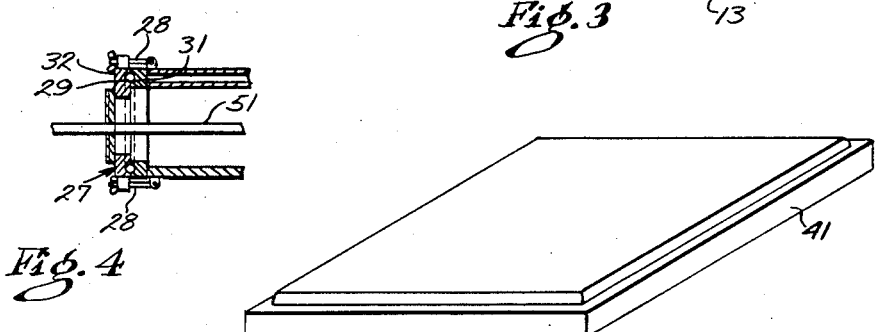
Fig. 4 is a cross section of the end plate showing the mounting means thereof.
Figure 5:
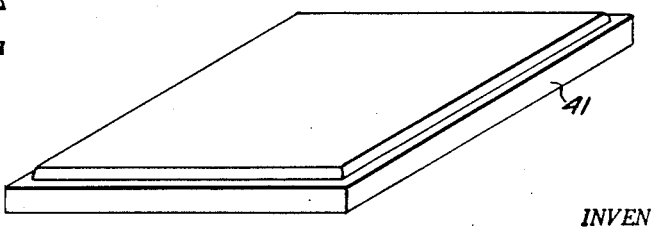
Fig. 5 is a perspective view of a clad slab of the type contemplated by this invention.

When forming clad slabs of metal according to my invention wherein a slab of metal is clad with a layer of another metal is has been found that small surface imperfections sometimes appear due to microshrinkage in the surface metal which appear as small holes and bubbles at the surface or just below the surface. These holes and bubbles are very minute in magnitude; however, when the slab is rolled and is stretched they result in undesirable elongated surface defects in the sheet of rolled metal. To eliminate these surface defects it is either necessary to refuse the surface metal causing it to flow together or remove the metal through the zone of the defects by mechanical means such as grinding. Grinding or machining of the surface metal is an expensive time consuming operation which is prohibitive in cost, so therefore fusing the surface is the most practical approach.

When refusing the surface it is important that only the surface of the clad sheet or slab be melted since overheating will result in the mixing of the two metals and the destruction of the desirable properties of the cladding metals. It is, therefore, necessary to provide a method and apparatus capable of economically heating only the surface of the clad slab to above its melting point. It is also necessary to provide an atmosphere surrounding the molten metal which prevents the oxidation or absorption of contaminating material which would destroy the desirable properties of the cladding material. The use of heliarc is prohibitive because of the high consumption of helium as well as the high apparatus cost and the large amount of time necessary for refusing the surface of a large slab of metal.

A method and apparatus according to this invention utilizes induction heating in an atmosphere of inert gas. The metal slab is moved past the inductors within a container filled with an inert gas preferably helium thereby rapidly heating and fusing the surface of the cladding metal causing the surface to flow and eliminate the defects caused by microshrinkage.

It is possible by utilizing induction type heating to rapidly heat the surface of the cladding metal thereby melting this surface without overheating the remaining portion of the cladding metal or clad metal. Also, by enclosing the clad slab within a container containing helium gas or any other gas which does not adversely affect the desirable properties of metal being fused, it is possible to reduce the cost which has heretofore been present when utilizing heliarc heating. Again, since the induction type heating does not require electrodes and the like, there is no expendable apparatus or material other than helium.

In a preferred embodiment of this invention the clad metal slab is inserted in a container. The container is then filled with helium gas thereby exhausting oxygen and other undesirable gases. The slab is then moved in a horizontal plane below the inductor thereby refusing the surface of the stainless steel. It is preferable to utilize a container which is water-jacketed to prevent overheating of the container during the induction heating of the slab. It is also preferable to maintain the helium within the container at slightly above atmospheric pressure thereby preventing any leakage of air into the container. An adjustable orifice may be utilized at the outlet to maintain the pressure of the helium within the container as the gas expands due to heating and an oxygen analyzer to determine whether the container is completely exhausted of all gases other than helium.

Referring to the drawings, the apparatus according to this invention includes a container C comprising a body 10, a top 11 and a dome 12.

The body 10 is preferably formed of a bottom 13 of heavy gauge metal and sides 14. The sides 14 are provided with double walls which are spaced to provide a water passage 16 through which water is circulated to cool the sides 14. Along the upper edge of the sides 14 a gasket flange 17 is mounted.

The top 11, like the sides 14, is preferably formed with inner and outer spaced walls 18 and 19 which provide a fluid passage therebetween for cooling water. Flange gaskets 21 are formed along the edge of the top and are adapted to engage with the flange gaskets 17 on the sides 14. The dome 12 is mounted in the top 11 and, like the top 11 and the sides 14, is provided with inner and outer spaced walls 22 and 23 respectively. Here again, water is circulated between the walls to provide for cooling of the dome system. Although the dome 12 and the top 11 are formed integrally the top 11 is separable from the body 10. A rubber gasket 24 is positioned between the gasket flanges 17 and 21 and provides a fluid seal therebetween when the clamps 26 are tightened thereby securely fastening the top 11 to the body 10. The ends 27 of the container are detachably mounted on the body and top by means of the clamps 28. A gasket 29 is positioned between the gasket flanges 31 and 32 thereby providing a fluid seal between the body 10, the top 11 and the ends 27.

The walls, top and dome are provided with fluid coolant inlets 33, 36 and 38 and with outlets 34, 37 and 39, respectively, to permit the circulation of cooling water. The body 10 is formed substantially twice the length of the slab of metal 41 which is to be refused so that the slab may be positioned in one end of the container and then moved past the inductor 42 thereby heating and refusing the surface. In the preferred embodiment the inductor 42 is formed of a single loop of copper tubing through which cooling water is circulated. The inductor 42 enters the dome area through the port 43 against which a non-conducting inductor seal 44 is clamped by means of the clamps 46 thereby providing a fluid seal between the port 43 and the inductor 42.

Rails 47 are mounted along the bottom 13 substantially adjacent to the edges thereof and provide track means along which the slab is moved. The rollers 48 are clamped onto the sides of the slab 41 by means of the clamp bracket 49 and are adapted to roll along the rails 47 thereby providing means whereby the slab 41 is easily moved along the container C. A plurality of cables 51 are attached to the ends of the slab 41 and pass through openings in the ends 27. These cables 51 pass over the pulleys 52 and 53 and pulley 52 is positively rotated by means of the motor 54. By this means the slab can be mechanically moved along the container C thereby passing the surface which is to be refused beneath the inductor 42. The openings in the ends 27 for the cables 51 are proportioned so as to tightly engage the cables which are preferably formed with a rubber coating so that a fluid seal is provided between the cables and the ends to prevent the loss of the gas.

A gas inlet 54 is provided in the dome 12 to permit the insertion of the inert gas into the container. The outlet 56 is provided in the bottom 13 to provide for the removal of the air initially within the container. In the preferred embodiment the inlet 54 is of a relatively large diameter so the turbulence of the gas flowing into the container will be reduced to a minimum. The oxygen analyzer 57 is connected to the outlet pipe 56 and is designed to detect the amount of oxygen present in the gas flowing out of the container through the outlet 56 thereby providing means for determining when the air is completely evacuated from the container and only inert gases are present therein. The oxygen analyzer 57 is also preferably provided with a variable outlet orifice which may be adjusted to maintain the pressure within the container at a level slightly above atmospheric pressure.

To form a clad slab of the type to be refused in the container C described above reference may be had to Fig. 6 where an arrangement for cladding a slab of metal is presented. The cladding may be accomplished by laying a series of electrodes 61 along the surface of a slab 62. Preferably in the arrangement of Fig. 6 the electrodes are provided with coatings 63 for forming a gaseous shield about the arcs although shielding material may be supplied in other ways. The series of electrodes are then covered with gravel 64 for protecting the arcs by a slag shield and welded simultaneously depositing a layer of the electrode metal on the surface of the slab 62. The arcs are started at the ends of the electrodes 61 by wads of steel wool, filings or the like interposed between the bared ends of the electrodes and the slab 62 or by carbon pencils. Each arc then progresses along the electrode as soon as the electrode is consumed. In order to reduce the expense of the electrodes it is possible to employ relatively cheap material for the electrodes and add alloying materials separately.

Figure 6:
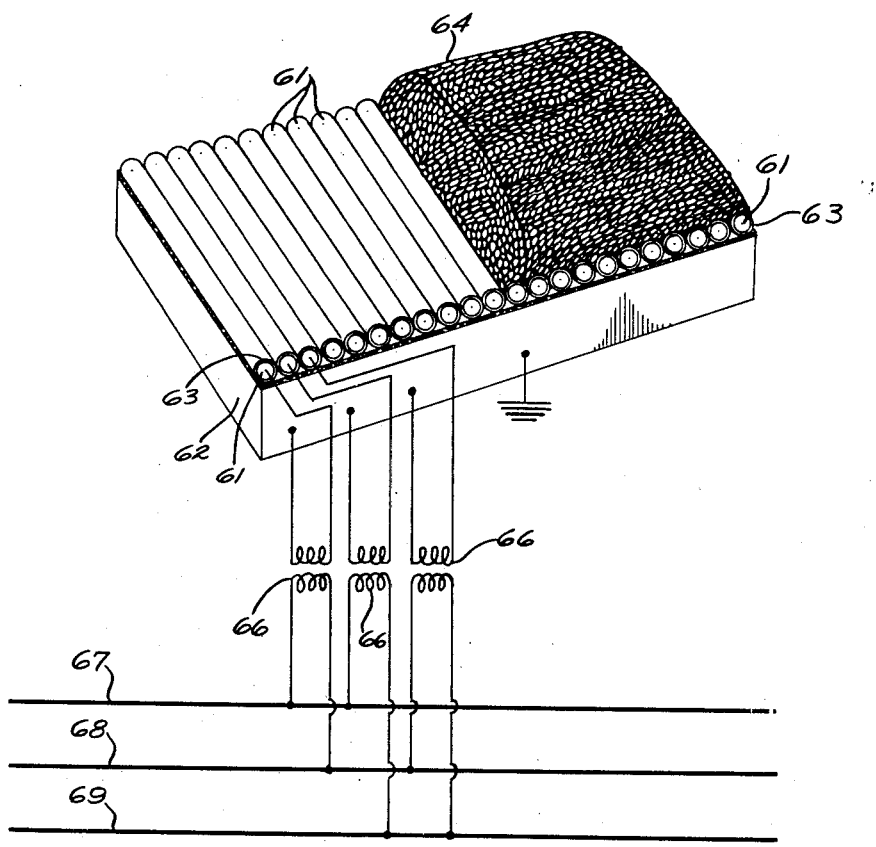
Fig. 6 is a perspective view partially schematic of an arrangement for producing a composite or clad slab of metal.

In this application of the process it is preferred to connect one side of a welding current circuit to each electrode 61 with the other side connected to the slab 62. This may be accomplished by providing a separate welding generator for each electrode, or, when it is desired to use alternating power, a transformer may be provided for each electrode. As shown in Fig. 6 transformers 66 may be connected to the three circuits of a three phase system supplied by the line wires 67, 68 and 69 so that each circuit supplies every third electrode through a transformer. In this way the load is balanced on the supply lines and at the same time, the heat developed by the arcs is balanced through each group of three electrodes thereby providing steadier and more uniform heating of the slab 62 and the electrode 61.

The cladding may also be carried out by using a single wide flat electrode as shown in Fig. 7. The slab 71 may be low carbon steel and the electrode 72 of stainless steel. The electrode is insulated with respect to the slab except at the arc as indicated by the arrows 73 by a layer 74 of prefused non-gas-forming material such as a crushed finishing slag from an electric arc furnace. The electrode 72 is covered with a layer 75 of non-gas-forming material such as the material of layer 74. Since the layer 75 is above the molten pool of metal indicated at 76 gas evolved by materials in the layer 75 would move upwardly out of the layer and accordingly ordinary gravel may be used. The layer 75 being melted by the arc prevents contamination of the molten electrode metal by the atmosphere and at the same time prevents spattering of the molten electrode material.

For a more detailed description of the cladding operation and apparatus reference should be made to said Patent No. 2,653,212.

After the slab is clad it is positioned in the cool end of the container C either by inserting the slab through the end or by lifting the top 11 by means of the lifting members 58. After the slab is positioned in the container as shown in phantom in Fig. 1 the container is sealed and a gas is pumped into the container through the inlet 54. Although helium is the preferred gas other gases may be utilized providing they do not have an undesirable effect upon the metal slab. In some cases it might be desirable to use other types such as a reducing atmosphere depending upon the effect desired. When the oxygen content of the gas exhausted through the outlet 56 drops to the desired value the power may be supplied to the inductor 42 from the generator which is not shown. At this time the motor 55 draws the slab 41 by means of the cables 51 beneath the inductor 42 thereby melting the surface of the slab 41. Because heat is generated during the fusing it is necessary to provide an outlet for the gas within the container to prevent excessive gas pressure so the adjustable orifice outlet is provided which preferably automatically maintains a pressure in a container of approximately 2 oz. over the atmospheric pressure. By maintaining a positive pressure within a chamber any leakage which occurs will be leakage out of the chamber and not leakage of air into the chamber thereby preventing any oxygen from entering the chamber which would cause undesirable oxidation of the slab.

In a preferred embodiment only the hot end 59 of the chamber is water-jacketed thereby reducing the structural cost of the apparatus considerably. However, if it is found necessary, both ends of the chamber may be water-jacketed to insure control of the temperature. Also the bottom has not been shown as water-jacketed since it is protected from heat by the slab.

In the preferred embodiment the dome is formed of deoxidized copper which is less likely to contaminate the cladding metal and the inductor seal 44 is preferably formed of a non-conducting non-magnetic material such as Masonite. It is apparent that the apparatus according to this invention permits the fusing of the surface of a sheet of metal to a desired depth merely by changing the power input in the inductor or changing the speed at which the slab is moved. It is also apparent that since induction heating is rapid very accurate fusing is accomplished with little tendency of the metal below the fused layer to be affected by the fusing process.

The composite metal resulting from the operation described in connection with Figs. 1 through 7 is thereafter rolled and trimmed as shown in Fig. 8. The rolling is carried out by conventional metal rolling equipment diagrammatically shown by the rolls 91 and 92. The resultant rolled strip 93 is trimmed by cutters 94 and 95 respectively. It has been found that the bond between the stainless steel and the low carbon steel or other combinations of metals effected by this invention is such that there is no separation produced by the rolling and that the resulting rolled strip is uniform and may be drawn or otherwise worked with greater ease than a solid stainless steel sheet of the same thickness.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A process of making clad metal comprising welding a layer of coating metal over a side surface of a slab of base metal and thereafter eliminating defects resulting from micro-shrinkage in the layer of coating metal which might cause surface defects after subsequent rolling of the coated slab, by bringing the surface of the layer of coating metal and an inductive heating means into inductive relation, supplying current to the inductive heating means, relatively moving the slab and the inductive heating means to melt progressively a thin portion of the surface of the entire layer of coating metal and regulating the current supplied to said inductive heating means and the rate of relative movement of the slab and the inductive heating means so as to confine the melting within the thickness of the said layer of coating metal without melting the junction between said coating metal and said base metal.

2. A process of making clad metal comprising welding a layer of stainless steel over a side surface of a slab of carbon steel and thereafter eliminating defects resulting from micro-shrinkage in the layer of stainless steel which might cause surface defects after subsequent rolling of the coated slab, by bringing the surface of the stainless steel and an inductive heating means into inductive relation, supplying current to the inductive heating means, relatively moving the slab and the inductive heating means to melt progressively a thin portion of the surface of the entire layer of stainless steel, regulating the current supplied to said inductive heating means and the rate of relative movement of the slab and the inductive heating means so as to confine the melting within the thickness of the said layer of stainless steel without melting the junction between said stainless steel and said carbon steel and maintaining an inert atmosphere around the surface of said stainless steel during the melting thereof.

3. An apparatus for curing surface defects of a slab of metal having a substantially flat side surface comprising a substantially gas-tight container, means within said container for supporting a slab of metal with a side surface facing upwardly and arranged substantially horizontal, an inductive heating element within said container arranged above and adjacent to the side surface of a slab supported on said supporting means and extending across one horizontal dimension thereof, means for producing relative movement of a slab on said supporting means and said inductive heating element in a direction to cause said heating element to traverse the other horizontal dimension of the upper surface of a slab, and means for supplying and maintaining a special atmosphere within said container.

4. An apparatus for fusing a substantially flat surface of a metal slab comprising a substantially gas-tight container, means within said container for supporting a slab of metal with a side surface facing upwardly and arranged substantially horizontal, an inductive heating element within said container arranged above and adjacent to the side surface of a slab supported on said supporting means and extending across one edge thereof, means for moving a slab on said supporting means in a direction to cause the entire surface of the slab to pass under said heating element, and means for supplying and maintaining a special atmosphere within said container.

5. An apparatus for curing surface defects of a clad slab of metal having a cladding layer of metal welded to a side surface thereof comprising a substantially gas-tight container, means within said container for supporting a clad slab of metal with a clad side surface facing upwardly and arranged substantially horizontal, inductive heating means within said container arranged above and adjacent to the clad side surface of a slab supported on said supporting means and extending across one horizontal dimension thereof, means for supplying current to said inductive heating means, means for producing relative movement of a slab on said supporting means and said inductive heating means in a direction to cause said heating means to traverse the other horizontal dimension of the clad surface of a slab, means for supplying and maintaining a special atmosphere within said container, the rate of such relative movement and the current supplied to said heating means being regulated to melt the clad surface of a slab and confine the melting within the depth of the layer of cladding metal.

6. An apparatus for fusing metal in a non-oxidizing atmosphere comprising a substantialy gas-tight container, means for supporting metal to be fused within said container, said container including side and end walls and a top wall having a separable joint above said supporting means; heating means within said container, a gas inlet opening into the upper end of said container and adapted to be connected to a pressurized supply of non-oxidizing gas lighter than air, a gas outlet communicating with the lower portion of said container and extending downwardly from said container, an oxygen detector communicating with said outlet below said container and having an opening to atmosphere, whereby excessive leakage of gas from said container through said separable joint during fusing of metal therein causes atmosphere to enter said oxygen detector before reaching the metal being fused in said container.

7. An apparatus for fusing a substantially flat surface of a rigid metal slab comprising supporting means including rollers for movably supporting a slab with a side surface facing upwardly and arranged substantially horizontal, means for moving said slab horizontally on said supporting means in one direction through a path of travel equal to the length of the slab in that direction, an inductive heating element above and adjacent the side surface of the slab and extending across the slab substantially perpendicular to the direction of said movement, a substantially gas-tight container extending over and around said inductive heating element, said supporting means and the slab and encompassing the entire path of movement of said slab on said supporting means, and means for supplying and maintaining a special atmosphere within said container.

8. An apparatus for fusing a substantially flat surface of a rigid metal slab comprising supporting means including rollers for movably supporting a slab with a side surface facing upwardly and arranged substantially horizontal, means for moving said slab horizontally on said supporting means in one direction through a path of travel equal to the length of the slab in that direction, an inductive heating element above and adjacent the side surface of the slab and extending across the slab substantially perpendicular to the direction of said movement, a substantially gas-tight container extending over and around said inductive heating element, said supporting means and the slab and encompassing the entire path of movement of said slab on said supporting means, said container having a fluid inlet and a fluid outlet, a source of inert gas connected to said inlet and an oxygen detector connected to said outlet.

9. In a method of forming a composite slab of metal having a base of one metal clad with a layer of another metal, including the steps of placing electrode material formed of cladding metal on a slab of base metal, applying an electric current between said electrode material and said slab, melting said electrode material onto the surface of said slab and freezing said molten metal in position on the surface of said slab; the steps of thereafter melting the surface of said cladding metal in a relatively narrow zone extending in one direction across said slab, progressively melting and re-freezing the entire surface of the cladding metal, and confining the melting within the thickness of said layer of cladding metal without melting the junction between said cladding metal and said slab.

References Cited in the file of this patent
UNITED STATES PATENTS

| | | |
|---|---|---|
| 1,845,322 | Neuhass | Feb. 16, 1932 |
| 1,998,496 | Fielder | Apr. 23, 1935 |
| 2,290,338 | Koehring | July 21, 1942 |
| 2,402,165 | Kinkead | June 18, 1946 |
| 2,453,019 | King | Nov. 2, 1948 |
| 2,490,084 | Munger | Dec. 6, 1949 |
| 2,528,758 | King | Nov. 7, 1950 |
| 2,600,453 | Weingart | June 17, 1952 |
| 2,653,212 | Kinkead | Sept. 22, 1953 |
| 2,657,298 | Andrus | Oct. 27, 1953 |